(12) United States Patent
Abali et al.

(10) Patent No.: US 9,262,090 B2
(45) Date of Patent: Feb. 16, 2016

(54) ASYNCHRONOUS DATA MIRRORING IN MEMORY CONTROLLER

(71) Applicant: Lenovo Enterprise Solutions (Singapore) PTE. LTD., Singpore (SG)

(72) Inventors: Bulent Abali, Hawthorne, NY (US); Makoto Ono, RTP, NC (US); Michael M. Tsao, Yorktown Heights, NY (US)

(73) Assignee: LENOVO ENTERPRISE SOLUTIONS (SINGAPORE) PTE. LTD., Serangoon Garden (SG)

( * ) Notice: Subject to any disclaimer, the term of this patent is extended or adjusted under 35 U.S.C. 154(b) by 106 days.

(21) Appl. No.: 13/777,470

(22) Filed: Feb. 26, 2013

(65) Prior Publication Data
US 2014/0244949 A1   Aug. 28, 2014

(51) Int. Cl.
| | |
|---|---|
| G06F 12/12 | (2006.01) |
| G06F 3/06 | (2006.01) |
| G06F 9/455 | (2006.01) |
| G06F 13/16 | (2006.01) |
| G06F 12/06 | (2006.01) |
| G06F 11/14 | (2006.01) |
| G06F 12/02 | (2006.01) |
| G06F 11/20 | (2006.01) |

(52) U.S. Cl.
CPC ............ *G06F 3/065* (2013.01); *G06F 9/45558* (2013.01); *G06F 11/1484* (2013.01); *G06F 3/067* (2013.01); *G06F 3/0614* (2013.01); *G06F 3/0617* (2013.01); *G06F 3/0656* (2013.01); *G06F 3/0683* (2013.01); *G06F 11/1451* (2013.01); *G06F 11/1456* (2013.01); *G06F 11/1461* (2013.01); *G06F 11/202* (2013.01); *G06F 12/0238* (2013.01); *G06F 12/0638* (2013.01); *G06F 12/12* (2013.01); *G06F 12/123* (2013.01); *G06F 13/1673* (2013.01); *G06F 2009/45583* (2013.01)

(58) Field of Classification Search
CPC ............ G06F 11/1451; G06F 11/1456; G06F 11/1461; G06F 3/0614; G06F 3/0656; G06F 3/0683; G06F 12/0238; G06F 12/0638; G06F 12/12; G06F 12/123; G06F 13/1673
USPC ........... 711/162, 171; 707/639, 645, 654, 659
See application file for complete search history.

(56) References Cited

U.S. PATENT DOCUMENTS

| | | | |
|---|---|---|---|
| 5,434,997 A | 7/1995 | Landry et al. | |
| 7,284,150 B2 * | 10/2007 | Ma et al. | 714/6.23 |
| 7,457,980 B2 * | 11/2008 | Yang et al. | 714/6.12 |
| 7,587,549 B1 * | 9/2009 | Arulambalam et al. | 711/112 |
| 8,542,693 B2 * | 9/2013 | Soni et al. | 370/412 |
| 2008/0313413 A1 * | 12/2008 | Hutner et al. | 711/162 |
| 2008/0320501 A1 * | 12/2008 | Li et al. | 719/324 |
| 2009/0113109 A1 * | 4/2009 | Nelson et al. | 711/6 |
| 2009/0185678 A1 * | 7/2009 | Walter et al. | 380/28 |

(Continued)

*Primary Examiner* — Reba I Elmore
(74) *Attorney, Agent, or Firm* — Olive Law Group, PLLC

(57) ABSTRACT

A method for mirroring data between virtual machines includes intercepting a write command initiated from a virtual machine. Address and data information from the intercepted write command is stored within a queue located within a memory buffer of the primary server. The stored address and data information is transferred, upon filling the queue of the memory buffer of the primary server to a predetermined level, to a dedicated region of the memory of the primary server. The stored address and data information is sent from the dedicated region of the memory of the primary server to a backup server upon filling of the dedicated region of the memory of the primary server to a predetermined level.

20 Claims, 7 Drawing Sheets

(56) References Cited

U.S. PATENT DOCUMENTS

| | | | |
|---|---|---|---|
| 2010/0011147 A1* | 1/2010 | Hummel et al. | 711/6 |
| 2011/0040923 A1* | 2/2011 | Ren | 711/5 |
| 2011/0041006 A1* | 2/2011 | Fowler | 714/10 |
| 2011/0167298 A1* | 7/2011 | Lee | 714/18 |
| 2012/0191908 A1* | 7/2012 | North et al. | 711/112 |
| 2012/0331083 A1* | 12/2012 | Li et al. | 709/212 |
| 2013/0104127 A1* | 4/2013 | Domsch et al. | 718/1 |
| 2013/0262767 A1* | 10/2013 | Lih et al. | 711/120 |
| 2013/0275808 A1* | 10/2013 | McNeeney et al. | 714/20 |
| 2014/0098822 A1* | 4/2014 | Galles et al. | 370/412 |
| 2014/0181015 A1* | 6/2014 | Bonzini | 707/613 |
| 2014/0317623 A1* | 10/2014 | Yokoyama | 718/1 |
| 2014/0321281 A1* | 10/2014 | Poole et al. | 370/235 |

\* cited by examiner

ASYNCHRONOUS DATA MIRRORING IN MEMORY CONTROLLER

TECHNICAL FIELD

The present disclosure relates to data mirroring and, more specifically, to asynchronous data mirroring in memory controller.

DISCUSSION OF THE RELATED ART

Today it is common for servers to be remotely hosted and accessible over the Internet. One example of such a server is the virtual private server (VPS). The virtual private server is a server hosted by a service provider and made accessible to the customer over the Internet. This arrangement frees the customer from having to manage its own server hardware and allows the service provider to achieve various economies of scale associated with hosting multiple servers from one or more locations. Rather than dedicating a computer system to the exclusive use of a single customer server, the service provider may run individual customer servers as virtual machines, and a single computer system may therefore be able to reliably execute multiple VPS on each of the computer systems it maintains.

Cloud-hosted virtual servers are not limited to VPS, service providers may also offer virtual servers that are publically accessible, for example, public websites and web services may be remotely hosted as virtual machines.

Fault tolerance is a primary concern for cloud-hosted virtual servers such as VPS. Fault tolerance relates to the ability of the hosted virtual server to survive a failure of the virtual machine or the physical machine on which it runs whether it is caused by ordinary failures or malicious attack. One approach to providing fault tolerance is the use of mirrored backup servers. A mirrored backup server is a secondary physical computer system that maintains data synchronization with the primary server, which is the physical machine hosting the virtual servers. As data is continuously mirrored, in the event of a failure of the primary server, the backup server may be brought online to resume the function of the primary server.

While there are several available approaches for maintaining adequate mirroring, one common approach is to periodically and temporarily suspend the function of the virtual machine and copy the memory contents of the virtual machine to a backup virtual machine that exists on the backup server. Rather than copying the entire memory contents at each suspension, a page table may be maintained to record the contents of each page of memory that has been changed by a write command for each virtual machine. Then, the page table may be used to update the memory contents of each backup virtual machine at each suspension. This may be performed by copying the full contents of the page table, which may be on the order of 4 KB, to the memory of the backup server associated with the particular backup virtual machine. One common implementation of this approach is called microcheckpointing. Here the page table represents the pages that have been changed since a last checkpoint, which is the state of the virtual machine the last time mirroring was performed.

While conventional microcheckpointing solutions may provide fault tolerance, they may be slow and inefficient as the virtual machines and/or the hypervisor may spend many computing cycles on building the page table and performing the periodic synchronization, which includes copying the relatively large page tables over the network.

SUMMARY

A method for mirroring data between virtual machines includes intercepting a write command initiated from a virtual machine. Address and data information from the intercepted write command is stored within a queue located within a memory buffer of the primary server. The stored address and data information is transferred, upon filling the queue of the memory buffer of the primary server to a predetermined level, to a dedicated region of the memory of the primary server. The stored address and data information is sent from the dedicated region of the memory of the primary server to a backup server upon filling of the dedicated region of the memory of the primary server to a predetermined level.

The method may further include receiving the sent address and data information by the backup server. The received address and data information may be stored within a dedicated region of a memory of the backup server. The stored address and data information may be transferred, upon availability of a memory buffer queue of the backup server, from the dedicated region of the memory of the backup server to the memory buffer queue of the backup server. The transferred address and data information may be written to a primary region of the memory of the backup server, distinct from the dedicated region of the memory of the backup server, as a write command of a primary virtual machine running on the backup server.

The queue of the memory buffer of the primary server may be an on-chip FIFO queue. The queue of the memory buffer of the backup server may be an on-chip FIFO queue. The queue of the memory buffer of the primary server may have a capacity of approximately 64 KB. The queue of the memory buffer of the backup server may have a capacity of approximately 64 KB. The dedicated region of the memory of the primary server may have a capacity of approximately 1 to 3 MB. The dedicated region of the memory of the backup server may have a capacity of approximately 1 to 3 MB.

Prior to sending the address and data information to the backup server, the address and data information may be compressed. The compressing of the address and data information may be performed within the memory buffer of the primary server. Prior to sending the address and data information to the backup server, the address and data information may be compressed and after receiving the address and data information in the backup server, the received address and data information may be decompressed. The decompression of the address and data information may be performed within the memory buffer of the backup server.

A memory buffer for mirroring data between virtual machines includes a system memory interface (SMI) for receiving a write command from a processor of a primary server to a primary region of a memory of the primary server. The write command is initiated by a primary virtual machine running on the primary server. A memory interface passes the received write command to a primary region of a system memory. An on-chip queue stores address and data information from the intercepted write command and transfers, upon the filling of the on-chip queue, the stored address and data information to the memory interface. A dedicated region of the system memory, distinct from the primary region of the system memory, stores the transferred address and data information as a plurality of log packets. Upon the filling of the dedicated region of the system memory, the stored log packets are transferred to a backup server.

The backup server may include a dedicated region of a memory of the backup server for storing the transferred log packets, a memory buffer for storing the address and data information from the log packets, as space is available therein, and a primary region of the memory of the backup server, distinct from the dedicated region, for storing the address and data information from the memory buffer of the backup server, as a write command.

The on-chip queue may be an on-chip chip FIFO queue having a capacity of approximately 64 KB. The dedicated region of the memory of the primary server may have a capacity of approximately 1 to 3 MB.

The memory buffer may further include a compressor for compressing the log packets prior to transferring the log packets to the backup server.

A computer program product mirrors data between virtual machines. The computer program product includes a computer readable storage medium having program code embodied therewith. The program code is readable/executable by a computer to intercept a write command from a processor of a primary server to a primary region of a memory of the primary server, the write command initiated by a primary virtual machine running on the primary server, store address and data information from the intercepted write command within a queue located within a memory buffer of the primary server, transfer, upon filling the queue of the memory buffer of the primary server to a predetermined level, the stored address and data information from the queue of the memory buffer of the primary server to a dedicated region of the memory of the primary server distinct from the primary region of the memory of the primary server, and send, upon filling of the dedicated region of the memory of the primary server to a predetermined level, the stored address and data information from the dedicated region of the memory of the primary server to a backup server.

The program code may further receive the sent address and data information by the backup server, store the received address and data information within a dedicated region of a memory of the backup server, transfer, upon availability of a memory buffer queue of the backup server, the stored address and data information from the dedicated region of the memory of the backup server to the memory buffer queue of the backup server, and write the transferred address and data information to a primary region of the memory of the backup server, distinct from the dedicated region of the memory of the backup server, as a write command of a primary virtual machine running on the backup server.

The program code may further compress the address and data information within the memory buffer of the primary server prior to sending the address and data information to the backup server.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
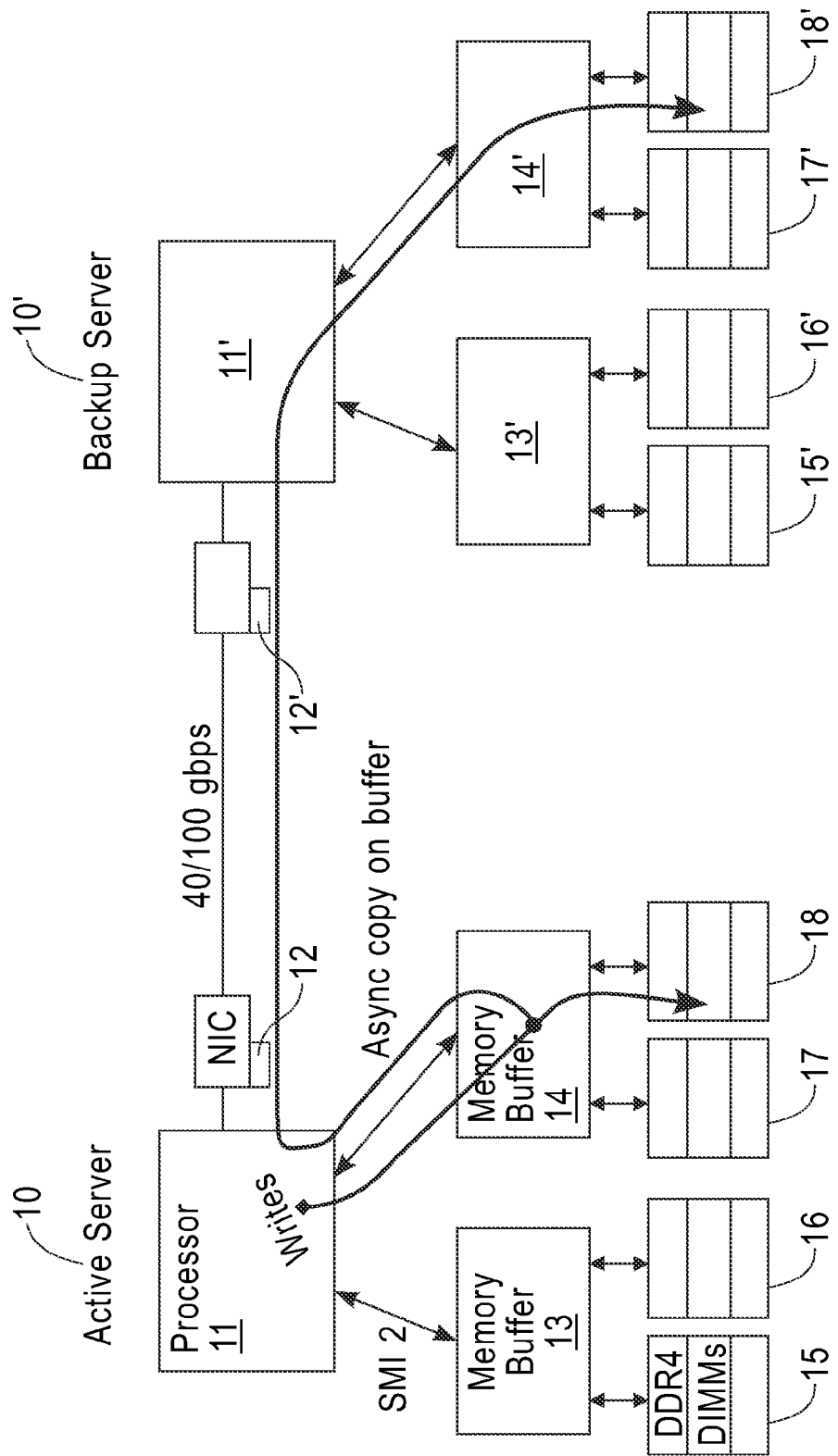
FIG. 1 is a schematic diagram illustrating a system for asynchronous data mirroring in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and approaches for performing fault tolerance for virtual machine servers. Rather than leaving the task of mirroring to the virtual machines and/or the hypervisor, exemplary embodiments of the present invention may utilize dedicated hardware within the memory controller of the primary and backup servers to asynchronously mirror data between the memory of the primary and secondary servers so that mirroring need not be managed at the virtual machine level and so that other computational efficiencies may be obtained.

FIG. 1 is a schematic diagram illustrating a system for asynchronous data mirroring in accordance with exemplary embodiments of the present invention. As described above, there may be a primary server 10 (also called an "active server") that includes a computer system executing a hypervisor layer and one or more virtual machines thereon. The primary server 10 may be synchronized to a backup server 10' for hosting backup virtual machines which may correspond to backups of the virtual machines on the primary server 10. While the primary server 10 and the backup server 10' may be located within a single location and directly connected, more commonly, the backup server 10' is remote.

The primary server 10 and the backup server 10' may execute software for managing the synchronization between the virtual machines on the two servers and for implementing the transition from primary 10 to backup 10' server in the event of a system failure. This software may be referred to herein as HA/FT software as it is tasked with providing either high availability (HA) or fault tolerance (FT) depending on the needs of the system implementing the software.

The primary server 10 may include a processor 11 and a network interface card 12 for communicating over a computer network to the backup server 10', which may have its own processor 11' and network interface card 12'. The network may be a local area network (LAN) or a wide area network (WAN) such as the Internet. Where the connection between the primary server 10 and the backup server 10' is made over a public network such as the Internet, a virtual private network (VPN) or other means may be used to ensure data security.

The primary server 10 and the backup server 10' may be substantially identical in configuration. For example, each server may include one or more memory buffers 13, 14, 13', and 14' for allowing the processors 11 and 11' to connect to a plurality of banks of memory cards 15, 16, 17, 18, 15', 16', 17', and 18'.

The memory buffers 13, 14, 13', and 14' may be used to connect the processors 11 and 11' to a greater number of memory cards than would otherwise be possible without the buffer. For example, the memory buffers may be used to connect an Intel EX socket processor with up to 24 DDR4 memory modules. Each memory buffer may include hardware for performing asynchronous memory mirroring (AMM). This hardware may be referred to herein as an AMM module.

The AMM may function to intercept write commands moving through the memory buffer from the processor to the memory modules and to record cacheline size writes, typically 64 bytes, to the memory that have occurred since a last checkpoint. The stored data may include the address of the memory being written to as well as the data being written. The data being written may be as small as 64 bytes, as it is not required that the contents of an entire 4 KB page be recorded.

The stored data may then be aggregated, compressed, and sent to the backup server after the aggregated data has reached a particular size. A similar AMM within the memory buffers of the backup server may receive the aggregated data, decompress the data, and implement the same writes to the memory modules of the backup server.

A more detailed description of an approach for implementing the operation of the AMM and the implementation of the transfer of the aggregated data is described below.

While the processor 11 of the primary server 10 may be responsible for transmitting the aggregated data to the backup server 10', the processor 11 itself need not be involved in intercepting and aggregating the write commands, this logic may be performed by the AMM. Similarly, while the processor 11' of the backup server 10' may be responsible for receiving the aggregated data from the primary server 10, the processor 11' of the backup server 10' need not be responsible for unpacking the write commands from the aggregated data and performing them on the memory modules of the backup server 10', this logic may be performed by the AMM.

Figure 2:
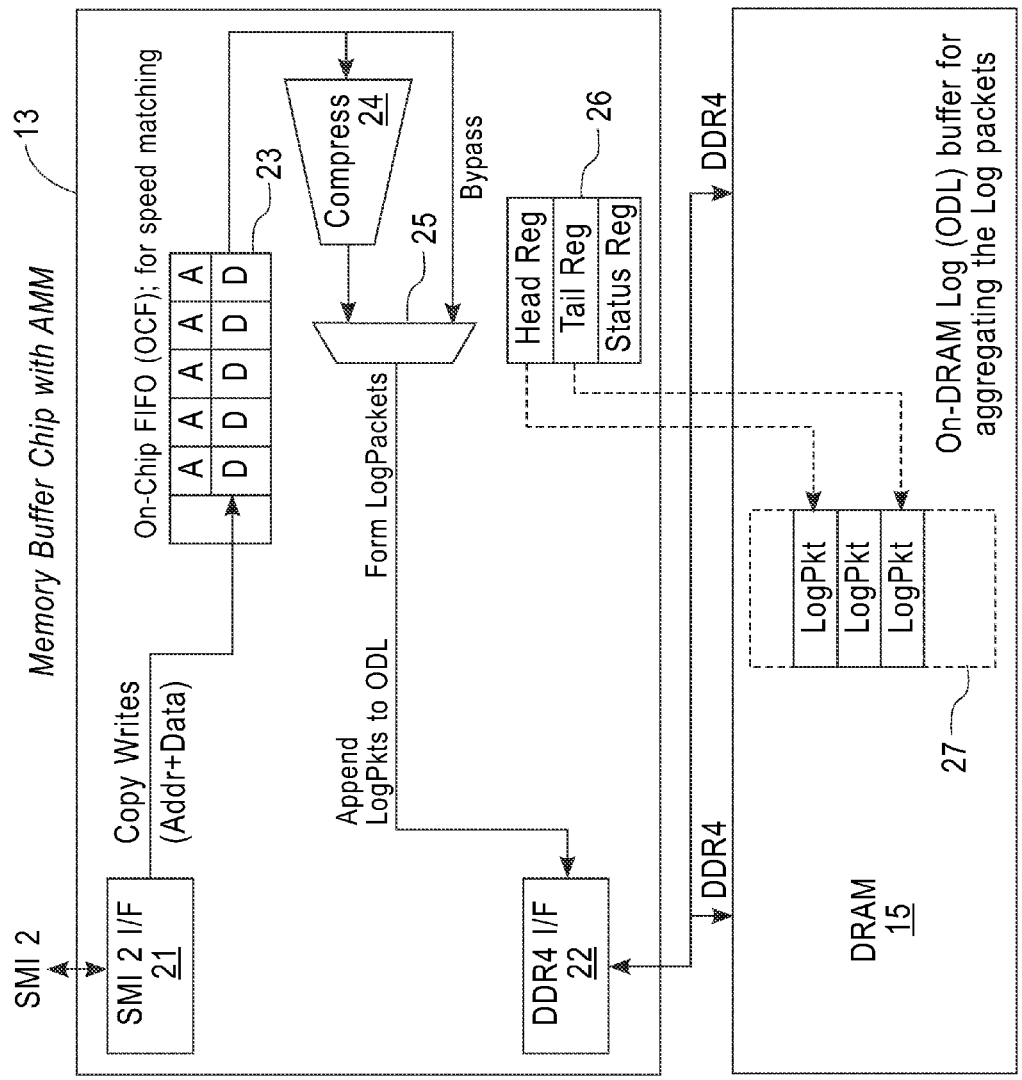
FIG. 2 is a schematic diagram illustrating a memory buffer chip including an AMM in accordance with exemplary embodiments of the present invention.

FIG. 2 is a schematic diagram illustrating a memory buffer chip including an AMM in accordance with exemplary embodiments of the present invention. The memory buffer 13 receives system memory interface (SMI) commands from the processor 11 via a SMI interface 21. The SMI commands may include memory reads and writes. These reads and writes are passed to the memory modules 15 via a memory interface 22 in the ordinary course of operation. However, copy logic of the AMM, within the memory buffer 13, copies writes from the SMI interface 21, including both the address of the memory being written to and the data being written, as cacheline address/data pairs, and moves these data pairs to a queue 23 such as an on-chip FIFO (OCF) queue. The OCF queue may be a high-speed queue built into the memory buffer chip itself. The OCF queue 23 may collect the address/data pairs until there are a sufficient number to be efficiently moved and/or when the OCF queue 23 is full or nearly full. The size of the OCF queue 23 may be limited only by the capabilities of the on-chip storage and may be, for example, 64 KB in size. It is acceptable that the OCF queue 23 be small in capacity. The data may thereafter be compressed in a compressor 24 or data may bypass the compressor 24. The compressed and bypassed data may be combined, for example, and made into packets using a packetized 25 to form log packets. The packet logs may include packet headers for describing the contents of each packet log. Compression may be optionally omitted, for example, where greater speed is desired at the expense of data size.

The log packets may be stored within a special and dedicated region of the memory 15 set aside for the log packets. As the memory 15 may be DRAM, the special and dedicated region for the storage of the log packets may be referred to herein as an on-DRAM log (ODL) 27. The ODL 27 may be significantly larger than the OCR. For example, the ODL 27 may have on the order of 1 to 3 MB of capacity.

The log packets may also include command/status registers for interacting with the AMMs and head and tail registers for pointing to the full location and the next empty location in the ODL 27. The head register, tail register, and status register information 27 may be provided by the memory buffer chip 13.

Once a sufficient amount of log packets have been acquired within the ODL 27, for example, the ODL 27 is full or nearly full, the log packets may be sent together back through the memory buffer 13, across the network, and back down to the corresponding AMM of the backup server 10' where the log packets can be decompressed and performed on the memory of the backup server 10' to thereby mirror the stored data of the primary server 10 with that of the backup server 10'. The HA/FT software, for example, implemented in the hypervisor of the primary and backup servers, may coordinate checkpoint activity and manage the operation of the AMMs as described herein. In addition to the ODL, the AMM may have registers exposed to the processor that may be accessible to the HA/FT software running on the primary server. The HA/FT software may access the AMM registers, for example, through reserved and dedicated regions of memory called AMM control space (C-space) and AMM data space (D-space). The HA/FT software may allocate the ODL from the D-space and may configure the memory buffer with a start location and length of the ODL.

The write address range of the OCF may be called an ODF2ODL write-address range and this range may be found within the C-space. The HA/FT software writing data within this range of addresses may cause a Head of the OCF to be written to a Tail of the ODL. This approach may be used where it is assumed that the memory buffer cannot generate its own memory bus cycles bit the memory controller on the processor chip can. In the processors 11 and 11', the Page Attribute Table (PAT) for OCF2ODL range may be set to Write-Combining (WC) avoiding unnecessary read cycles on the DDR bus.

A separate ODL2OCF read-address range, for example, as large as OCF, may be found within the C-space. Reading from this range may cause the Head of the ODL to be written to the Tail of the OCF. Here, the PAT for ODL2OCF range may be set to WriteBack (cacheable).

A separate ODF2Mem write address rage, for example, as large as OCF, may also be found within the C-space. Writing any data here may cause Head of OCF to be unpacked and data D to be written to a predetermined location. Here, the PAT for OFC2Mem range may be set to Write-Combining (WC).

Figure 3:
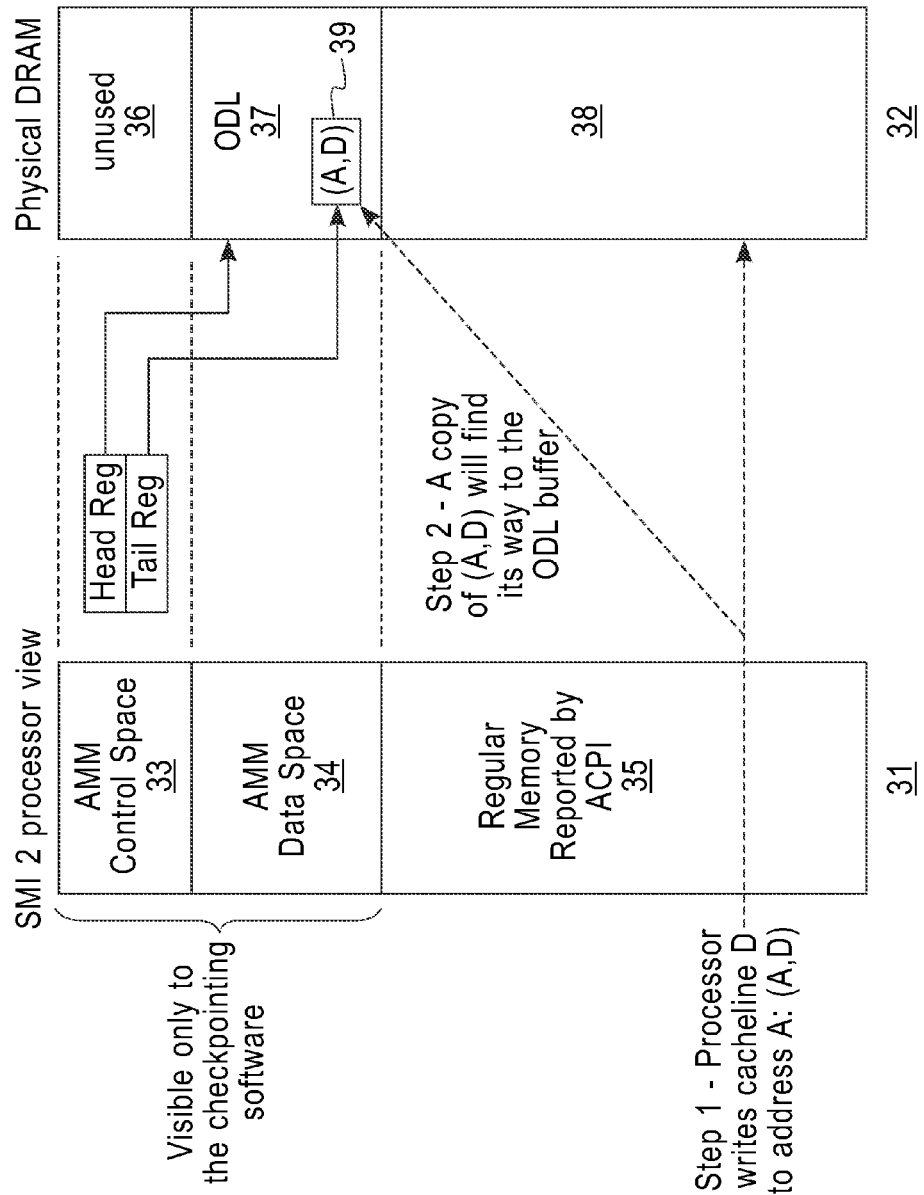
FIG. 3 is a schematic diagram illustrating the above-described memory address map in accordance with exemplary embodiments of the present invention.

FIG. 3 is a schematic diagram illustrating the above-described memory address map in accordance with exemplary embodiments of the present invention. As may be seen, the memory buffer addresses may have a SMI processor view 31 and a physical DRAM view 32. The HA/FT software (described within the figure as "checkpointing software") may have access to the AMM control space 33 and the AMM data space 34. There may also be a regular memory reported by the ACPI 35 that may be viewed from the processor but not the HA/FT software. Within the physical DRAM view 32, there may be a main memory 38, an ODL section 37, and an unused portion 36. The processor may write cacheline D to an address A: (A,D) within the ODL memory space 37. The cacheline data may also be written to the main memory section 38 in the ordinary course.

Figure 4:
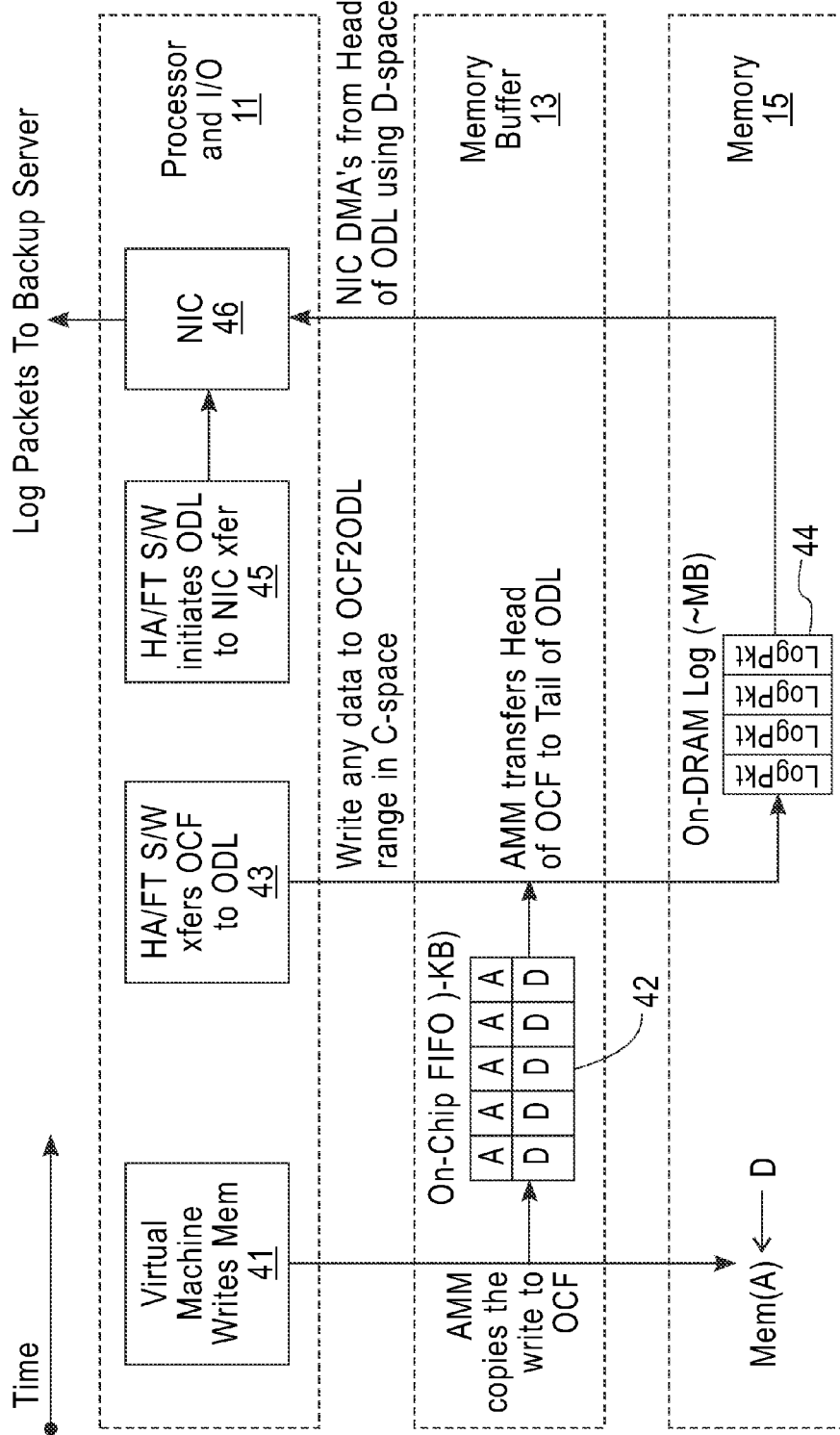
FIG. 4 is a flow chart illustrating an approach by which the primary server may send mirroring information to the backup server in accordance with exemplary embodiments of the present invention.
Figure 5:
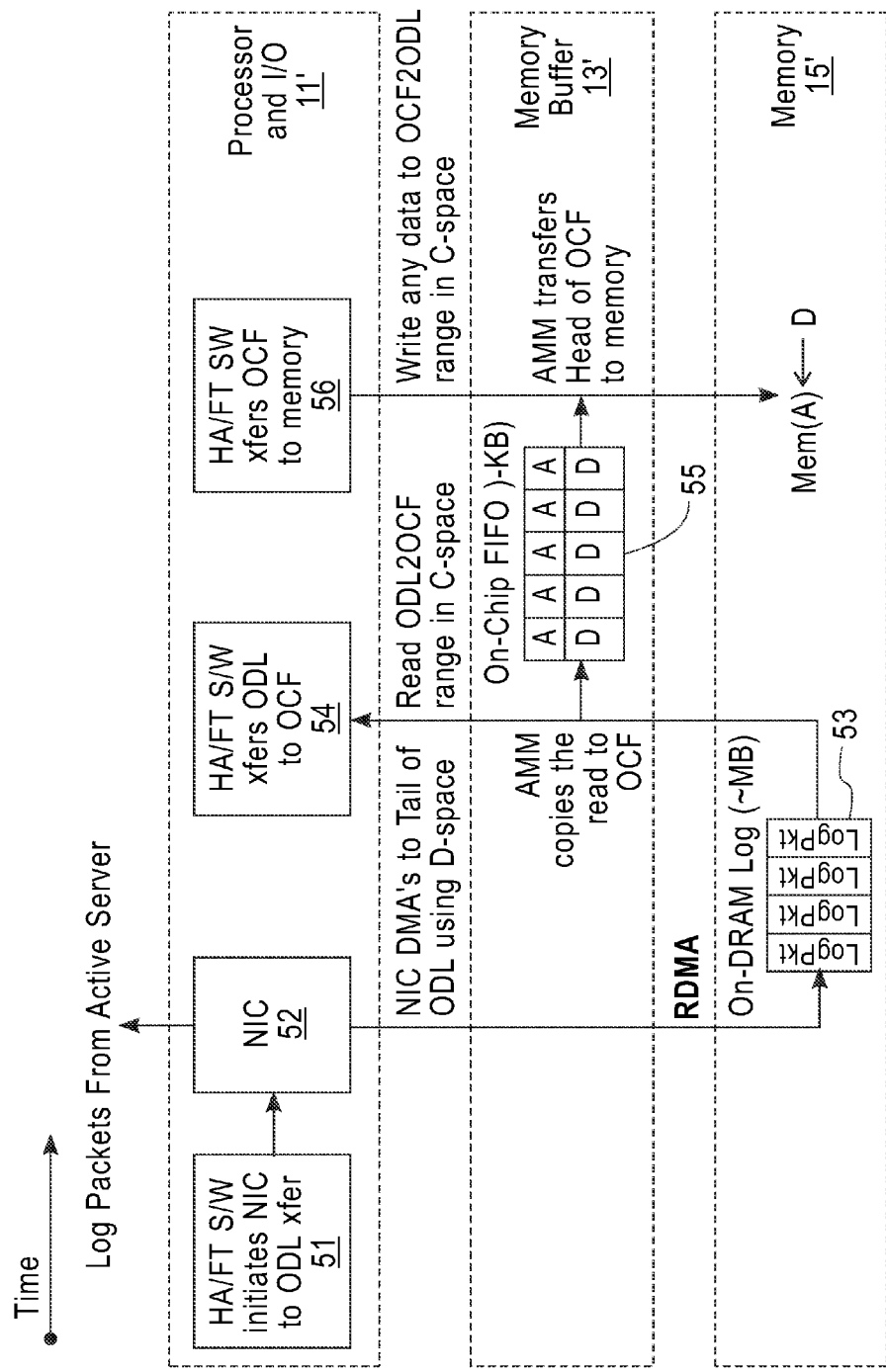
FIG. 5 is a flow chart illustrating an approach by which the backup server may receive mirroring information from the primary server in accordance with exemplary embodiments of the present invention.

FIG. 4 is a flow chart illustrating an approach by which the primary server may send mirroring information to the backup server in accordance with exemplary embodiments of the present invention. FIG. 5 is a flow chart illustrating an approach by which the backup server may receive mirroring information from the primary server in accordance with exemplary embodiments of the present invention. For the purpose of providing a simple description, the description may be limited to a discussion of the backing up of one virtual machine, however, it is to be understood that the primary server may have any number of virtual machines running thereon and any number of these virtual machines may be similarly mirrored.

First, the processor 11 of the primary server 10 may issue a memory write command from within a virtual server being backed up (41). This command may result in data "D" being written to the memory 15 at an address "A". However, the AMM of the memory buffer 13 may intercept the write command and store the data D and address A within the OCF queue (42). When the OCF queue of the memory buffer 13 is full or nearly full, for example, after some number of KB have been collected, the AMM may create log packets of the queue address and data pairs. These log packets may be used to transfer the entries of the OCF to the ODL. As the entire contents of the OCF may be appended to the first free region of the ODL, the head of OCF may be transferred to the tail of ODL (43). This transfer may be handled by the HA/FT software running on the processor 11. The log packets may then be stored in the dedicated segment of the memory 15 known as the ODL (44).

In the memory 15, a predetermined amount of data may be aggregated, for example, as determined by the capacity of the ODL. After the ODL is full or nearly full, the aggregated data may be transferred via the NIC 12 (46). The HA/FT software may initiate this transfer from ODL to the NIC 12 (45).

The log packets are transferred from the primary server 10 across the network to the backup server 10' where they are received by the NIC 12' of the backup server 10' (52). The HA/FT software running on the processor 11' of the backup server 10' may initiate a transfer of the packets from the NIC 12' to the ODL of the backup server 10' (51). In transferring the packets from the NIC to the ODL, the packets are appended to the free space of the ODL, as pointed by the tail (53).

According to an arrangement substantially the reverse of the arrangement discussed above, the contents of the ODL may be transferred to the OCF (54). This transfer may be handled by the HA/FT software running on the processor 11'. Because the OCF is substantially smaller than the ODL, the packets may be moved in small units to the OCF as space becomes available therein (55). The payload of the log packets may be unpacked back into A/D pairs prior to being written to the OCF.

The HA/FT software may initiate a writing of the A/D pairs stored in the OCF into the main memory 15' of the backup server 10' (56). As the entire content of the OCF may be moved into the memory, the AMM may transfer the head of the OCF into memory. After the contents of the OCF have been transferred, the HA/FT software may continue to transfer the contents of the ODL to the OCF and then to the memory until the ODL is clear. Once there are no more log packets within the ODL and no more A/D pairs within the OCF, the memory of the backup server may be understood to be a mirror of the memory of the primary server. A checkpoint may be established at this point. However, checkpoints need not be established as the transfer of new aggregated log packet data from the primary server to the backup server may be asynchronous and continuous. However, in the event of a failure of the primary server, the full contents of the ODL and OCF may be given time to move through to the main memory before the function of the primary server is handed over to the backup server.

It may be noted that in transferring the information from the OCF to the ODL, writing to the OCF2ODL range of memory may cause data to be moved from OCF buffer head to ODL buffer tail. The AMM may replace processor write address with the ODL.Tail register contents. The AMM may drop and replaces processor write data with the head item in the OCF, as pointed by the OCF.Head register.

Reading from the ODL2OCF range may cause data to be moved from ODF buffer head to OCF buffer tail. The AMM may replace processor read address with the ODL.Head register contents. The AMM may drop processor read data and instead, a status value may be returned to indicate whether ODL is empty or full.

The AMM may also generate its own data, for example, the Log Packets. Therefore AMM is able to generate as well as verify Error Checking and Correcting codes (ECC's) used in state of the art memory systems, using the same ECC formula that the processor uses.

It may be assumed that the Memory Buffer cannot generate its own memory bus cycles but the memory controller on the processor chip can. Therefore, software running on the processor can be involved in moving data between OCF and ODL buffers. This may be implemented, for example, by dedicating a core of the processor for a software task running with real time priority. This requirement may be eliminated in where the Memory Buffer is capable of generating its own memory bus cycles.

Figure 6:
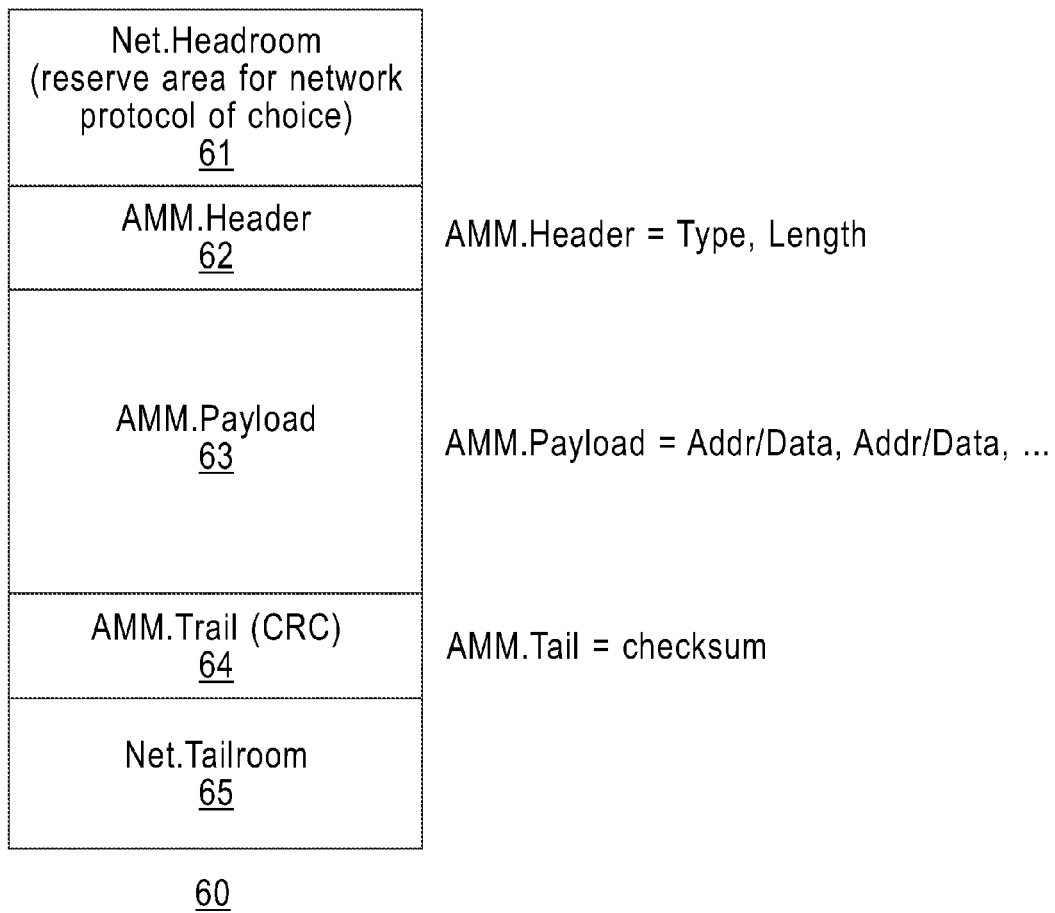
FIG. 6 is a schematic diagram illustrating an exemplary format for log packet data in accordance with exemplary embodiments of the present invention.

While the log packets themselves may have any arrangement, FIG. 6 is a schematic diagram illustrating an exemplary format for log packet data in accordance with exemplary embodiments of the present invention. The packet 60 may include an AMM payload 63. The payload may include the address/data pairs from the intercepted write commands. The packet may also include a section for header information 62, for example, including an identification of the packet type and art indication of the packet's total length. The packet may also include a tail section 64 for storing checksum information. The packet may also include sections for headroom 61 and tailroom 65. These sections may be reserved for network protocol components.

Figure 7:
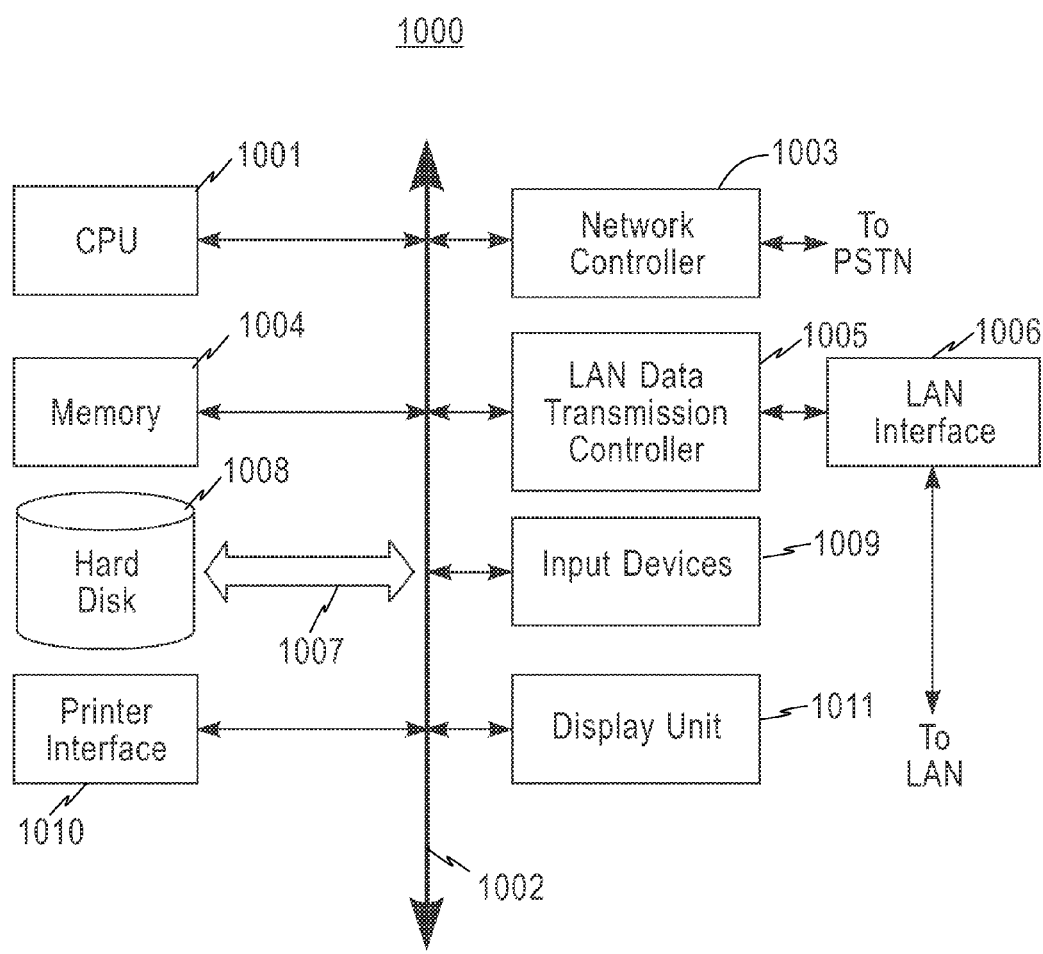
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:
1. A method for mirroring data between virtual machines, comprising:
  using a memory buffer of a primary server for:
    intercepting a write command from a processor of the
      primary server to a primary region of a memory of the primary server, the write command initiated by a primary virtual machine running on the primary server;
storing address and data information from the intercepted write command within a queue located within the memory buffer of the primary server;
determining whether the queue of the memory buffer of the primary server is above a threshold for the queue of the memory buffer; and
in response to determining that the queue of the memory buffer of the primary server is above the threshold for the queue of the memory buffer:
transferring the stored address and data information from the queue of the memory buffer of the primary server to a dedicated region of the memory of the primary server distinct from the primary region of the memory of the primary server;
determining whether the dedicated region of the memory of the primary server is at a threshold for the dedicated region; and
in response to determining that the dedicated region of the memory of the primary server is above the threshold for the dedicated region, using the processor and a network interface card of the primary server to send the stored address and data information from the dedicated region of the memory of the primary server to a backup server.

2. The method of claim 1, further comprising:
receiving the sent address and data information by the backup server;
storing the received address and data information within a dedicated region of a memory of the backup server;
transferring, upon availability of a memory buffer queue of the backup server, the stored address and data information from the dedicated region of the memory of the backup server to the memory buffer queue of the backup server; and
writing the transferred address and data information to a primary region of the memory of the backup server, distinct from the dedicated region of the memory of the backup server, as a write command of a primary virtual machine running on the backup server.

3. The method of claim 1, wherein the queue of the memory buffer of the primary server is an on-chip FIFO queue.

4. The method of claim 2, wherein the queue of the memory buffer of the backup server is an on-chip FIFO queue.

5. The method of claim 1, wherein the queue of the memory buffer of the primary server has a capacity of approximately 64 KB.

6. The method of claim 2, wherein the queue of the memory buffer of the backup server has a capacity of approximately 64 KB.

7. The method of claim 1, wherein the dedicated region of the memory of the primary server has a capacity of approximately 1 to 3 MB.

8. The method of claim 2, wherein the dedicated region of the memory of the backup server has a capacity of approximately 1 to 3 MB.

9. The method of claim 1, wherein prior to sending the address and data information to the backup server, the address and data information is compressed.

10. The method of claim 9, wherein the compressing of the address and data information is performed within the memory buffer of the primary server.

11. The method of claim 2, wherein prior to sending the address and data information to the backup server, the address and data information is compressed and after receiving the address and data information in the backup server, the received address and data information is decompressed.

12. The method of claim 11, wherein the decompression of the address and data information is performed within the memory buffer of the backup server.

13. A memory buffer of a primary server for mirroring data between virtual machines, the memory buffer comprising:
a system memory interface (SMI) configured to receive a write command from a processor of the primary server to a primary region of a memory of the primary server, the write command initiated by a primary virtual machine running on the primary server;
a memory interface of the primary server configured to pass the received write command to a primary region of a system memory of the primary server;
an on-chip queue configured to:
store address and data information from the intercepted write command;
determine whether the on-chip queue is at above a threshold for the on-chip queue;
transfer the stored address and data information to the memory interface in response to determining that the on-chip queue is above the threshold for the on-chip queue; and
a dedicated region of the system memory, distinct from the primary region of the system memory, configured to store the transferred address and data information as a plurality of log packets,
wherein upon determining the dedicated region of the system memory is above a threshold for the dedicated region, the processor and a network interface card of the primary server sends the stored log packets to a backup server.

14. The memory buffer of claim 13, wherein the backup server comprises:
a dedicated region of a memory of the backup server for storing the transferred log packets;
a memory buffer for storing the address and data information from the log packets, as space is available therein; and
a primary region of the memory of the backup server, distinct from the dedicated region, for storing the address and data information from the memory buffer of the backup server, as a write command.

15. The memory buffer of claim 13, wherein the on-chip queue is an on-chip chip FIFO queue having a capacity of approximately 64 KB.

16. The memory buffer of claim 13, wherein the dedicated region of the memory of the primary server has a capacity of approximately 1 to 3 MB.

17. The memory buffer of claim 13, further comprising a compressor for compressing the log packets prior to transferring the log packets to the backup server.

18. A computer program product for mirroring data between virtual machines, the computer program product comprising a non-transitory, computer readable storage medium having program code embodied therewith, the program code readable/executable by a computer to:
intercept, at a memory buffer of a primary server, a write command from a processor of the primary server to a primary region of a memory of the primary server, the write command initiated by a primary virtual machine running on the primary server;
store address and data information from the intercepted write command within a queue located within the memory buffer of the primary server;
determine whether the queue of the memory buffer of the primary server is above a threshold for the queue of the memory buffer; and in response to determining that the memory buffer of the primary server is above the threshold for the queue of the memory buffer:
  transfer the stored address and data information from the queue of the memory buffer of the primary server to a dedicated region of the memory of the primary server distinct from the primary region of the memory of the primary server;
  determine whether the dedicated region of the memory of the primary server is at threshold for the dedicated region; and
  in response to determining that the dedicated region of the memory of the primary server is above the threshold for the dedicated region, use the processor and network interface card of the primary server to send the stored address and data information from the dedicated region of the memory of the primary server to a backup server.

19. The computer program product of claim 18, the program code readable/executable by a computer to further:
  receive the sent address and data information by the backup server;
  store the received address and data information within a dedicated region of a memory of the backup server;
  transfer, upon availability of a memory buffer queue of the backup server, the stored address and data information from the dedicated region of the memory of the backup server to the memory buffer queue of the backup server; and
  write the transferred address and data information to a primary region of the memory of the backup server, distinct from the dedicated region of the memory of the backup server, as a write command of a primary virtual machine running on the backup server.

20. The computer program product of claim 18, the program code readable/executable by a computer to further:
  compress the address and data information within the memory buffer of the primary server prior to sending the address and data information to the backup server.

* * * * *